(12) United States Patent
Nakanishi et al.

(10) Patent No.: US 6,787,224 B2
(45) Date of Patent: Sep. 7, 2004

(54) COVER TAPE FOR PACKAGING ELECTRONIC COMPONENTS

(75) Inventors: Hisao Nakanishi, Tokyo (JP); Masayuki Hiramatsu, Tokyo (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 44 days.

(21) Appl. No.: 10/179,388

(22) Filed: Jun. 26, 2002

(65) Prior Publication Data

US 2003/0035946 A1 Feb. 20, 2003

(30) Foreign Application Priority Data

Jun. 26, 2001 (JP) ........................................ 2001-193036
Oct. 17, 2001 (JP) ........................................ 2001-318816

(51) Int. Cl.⁷ ................................................ B32B 7/02
(52) U.S. Cl. ...................... 428/335; 428/328; 428/336; 428/354; 428/355 R; 428/355 EN; 428/355 AC; 428/356; 428/475.2; 428/475.8; 428/476.1; 428/476.3; 428/476.9; 428/483; 428/516; 428/517; 428/910; 428/922
(58) Field of Search ................................. 428/328, 335, 428/336, 354, 355 R, 355 EN, 355 AC, 356, 475.2, 475.8, 476.1, 476.3, 476.9, 483, 516, 517, 910, 922, 323

(56) References Cited

U.S. PATENT DOCUMENTS 5,208,103 A * 5/1993 Miyamoto et al. ........... 428/354
5,721,086 A * 2/1998 Emslander et al. .......... 430/126

FOREIGN PATENT DOCUMENTS

| EP | 0 501 068 A1 | 9/1992 |
| EP | 0 520 515 | 12/1992 |
| WO | WO 97/19140 | 5/1997 |

OTHER PUBLICATIONS

European Search Report, dated Dec. 16, 2002, for European Patent Application No. EP02013946.5 (3 pages).

* cited by examiner

*Primary Examiner*—D. S. Nakarani
(74) *Attorney, Agent, or Firm*—Smith, Gambrell & Russell, LLP

(57) ABSTRACT

A cover tape for packaging electronic components, which can prevent troubles associated with the peeling strength or trouble appearing during mounting of the electronic components, which can be produced at a low cost, and which is transparent; that is, a cover tape has a peeling strength not too high and not too low and small in difference between the maximum value and the minimum value and which has high transparency. Specifically, the cover tape for packaging electronic components, which can be heat-sealed to a plastic-made carrier tape having pockets capable of storing electronic components, formed regularly therein and which is made of (A) a biaxially oriented film layer made of polyester, a polypropylene or a nylon and (B) a thermoplastic resin layer composed of 100 parts by weight of an ethylene copolymer and 10 to 100 parts by weight of polystyrene, laminated to one side of the layer A.

16 Claims, 1 Drawing Sheet

COVER TAPE FOR PACKAGING ELECTRONIC COMPONENTS

TECHNICAL FIELD

The present invention relates to one member constituting a packaging material which is used for storage, transportation and mounting of electronic components and which can protect the electronic components from staining and, for mounting of the electronic components on a substrate for electronic circuit, enables alignment and taking-out of the electronic components; that is, a cover tape which can be sealed to a plastic-made carrier tape having pockets for storage of electronic components, formed therein.

BACKGROUND ART

Electronic components to be surface-mounted, such as IC, transistor, diode, capacitor, piezoelectric resistor and the like are supplied by being packed in a packaging material comprising (a) a plastic-made carrier tape in which pockets for storage of electronic components have been regularly formed by embossing, in a shape corresponding to those of the electronic components and (b) a cover tape which can be sealed to the carrier tape. The electronic components contained in the packaging material are automatically taken out from the packaging material after the cover tape has been peeled, and are surface-mounted on a substrate for electronic circuit. Electronic components have become smaller, lighter and thinner recently.

Meanwhile, the speed of surface mounting has increased and the speed at which the cover tape of the packaging material is peeled from the carrier tape, has increased as well. As a result, a pulsation phenomenon, that is, a phenomenon in which the strength when peeling is made (this strength is hereinafter referred to as peeling strength) fluctuates high and low, appears strikingly and jumping troubles caused by jumping-out of packed electronic components from the carrier tape are increasing.

When the electronic components packed in a packaging material are relatively large, the peeling strength of the packaging material is often set high beforehand in order to prevent the electronic components from jumping out from the carrier tape during transportation. In that case, however, if the peeling strength changes with time and becomes too high, the cover tape is difficult to peel smoothly during mounting, which invites, in some cases, a trouble of being incapable of taking out the electronic components or a trouble of cover tape rupture. The trouble associated with the peeling strength has been prevented by laminating an adhesive layer film obtained by using a mixture of several kinds of resins, onto a base layer film such as biaxially oriented polyester film or the like, by dry lamination or extrusion lamination.

The trouble appearing during mounting, such as cover tape rupture or the like has been prevented by laminating two oriented films with each other by dry lamination or the like to obtain a tough base layer.

In any of these countermeasures, however, the step of film formation and the step of lamination are independent, which requires a long-time process, incurs a high production cost, and does not satisfy the recent requirement of lower cost for electronic components.

The electronic components contained in a packaging material are automatically taken out after the cover tape of the packaging material has been peeled, and are surface-mounted on a substrate for electronic circuit. At that time, if the peeling strength of the cover tape has a large difference between the maximum value and the minimum value, there are caused cases that the carrier tape waves and the electronic components contained therein jump out; if the peeling strength is too high, there are caused cases that the cover tape cuts; and if the peeling strength is too small, there appears a case that the cover tape is peeled off before the mounting step is reached and the electronic components are detached from the carrier tape.

DISCLOSURE OF THE INVENTION

The present invention provides a cover tape which can prevent the above-mentioned troubles associated with peeling strength or appearing during mounting, which can be produced at a low cost, and which is transparent.

Also, according to the present invention, by reducing the production steps such as dry lamination, extrusion lamination and the like, the amount of an organic solvent used can be decreased, resulting in reduced environmental pollution and, moreover, the energy required can be saved.

The present invention further provides a cover tape which has a peeling strength not too high and not too low and small in difference between the maximum value and the minimum value and which has high transparency.

Specifically, the present invention provides the following cover tapes.

(1) A cover tape for packaging electronic components, which can be heat-sealed to a plastic-made carrier tape having pockets capable of storing electronic components, formed regularly therein and which comprises (A) a biaxially oriented film layer made of a polyester, a polypropylene or a nylon and (B) a thermoplastic resin layer composed of 100 parts by weight of an ethylene copolymer and 10 to 100 parts by weight of a polystyrene, laminated to one side of the layer A.

(2) A cover tape for packaging electronic components according to the above (1), wherein at least one kind of layer selected from the group consisting of a non-oriented polyester layer, a non-oriented nylon layer and a non-oriented polypropylene layer is interposed between the layer A and the layer B.

(3) A cover tape for packaging electronic components according to the above (1) or (2), wherein a comonomer of the ethylene copolymer contained in the layer B is at least one kind selected from the group consisting of vinyl acetate, acrylic acid, an acrylic acid ester, methacrylic acid, a methacrylic acid ester and an ionomer.

(4) A cover tape for packaging electronic components according to the above (1) or (2), wherein the proportion of a comonomer of the ethylene copolymer contained in the layer B is 17 to 90 parts by weight relative to 100 parts by weight of ethylene.

(5) A cover tape for packaging electronic components according to the above (1) or (2), wherein the layer B has a thickness of 0.5 to 50 $\mu$m.

(6) A cover tape for packaging electronic components according to the above (1) or (2), wherein the layer B gives rise to cohesive failure and peeling when the cover tape is heat-sealed to the carrier tape and then is peeled from the carrier tape.

(7) A cover tape for packaging electronic components according to the above (1) or (2), wherein an electrically conductive fine powder made of tin oxide, zinc oxide, titanium oxide, carbon black or a combination thereof and/or a surfactant is dispersed in the layer B and the layer B has a surface resistivity of $1 \times 10^{13}$ Ω/□ or less.

(8) A cover tape for packaging electronic components according to the above (1) or (2), wherein an antistatic layer which has dispersed therein an electrically conductive fine powder made of tin oxide, zinc oxide, titanium oxide, carbon black or a combination thereof and/or a surfactant, is formed on the surface of the layer B and the antistatic layer has a surface resistivity of $1 \times 10^{13}$ Ω/□ or less.

(9) A cover tape for packaging electronic components according to the above (1) or (2), which has a peeling strength of 0.1 to 1.3 N per mm of the sealed width of the tape, when the cover tape is heat-sealed to the carrier tape and then peeled from the carrier tape.

(10) A cover tape for packaging electronic components according to the above (1) or (2), which has a luminous transmittance of 70% or more and a haze of 80% or less.

(11) A cover tape for packaging electronic components according to the above (1) or (2), which has a difference between the maximum value and the minimum value in peeling strength, of 0.01 to 0.4 N per mm of the sealed width of the tape, when the cover tape is heat-sealed to the carrier tape and then peeled from the carrier tape.

(12) A cover tape for packaging electronic components, which can be heat-sealed to a plastic-made carrier tape having pockets capable of storing electronic components, formed regularly therein and which comprises at least two layers of an adhesive layer and a base layer, the adhesive layer being present at the side of the cover tape heat-sealed to the carrier tape, the two layers being laminated with each other by co-extrusion, and the base layer being a polyester, a nylon or a polypropylene.

(13) A cover tape for packaging electronic components, which can be heat-sealed to a plastic-made carrier tape having pockets capable of storing electronic components, formed regularly therein and which comprises at least three layers of an adhesive layer, an interlayer and a base layer in this order, the adhesive layer being present at the side of the cover tape heat-sealed to the carrier tape, the interlayer and the base layer being laminated with each other by co-extrusion, and the adhesive layer being laminated by gravure coating.

(14) A cover tape for packaging electronic components according to the above (12), wherein the adhesive layer is made of an ethylene-α-olefin copolymer and the α-olefin is vinyl acetate, acrylic acid, an acrylic acid ester, methacrylic acid or a methacrylic acid ester.

(15) A cover tape for packaging electronic components according to the above (13), wherein the interlayer is made of an ethylene-α-olefin copolymer and the α-olefin is vinyl acetate, acrylic acid, an acrylic acid ester, methacrylic acid or a methacrylic acid ester.

(16) A cover tape for packaging electronic components according to the above (13) or (15), wherein the adhesive layer is made of an ethylene-α-olefin copolymer wherein the α-olefin is vinyl acetate, acrylic acid, an acrylic acid ester, methacrylic acid or a methacrylic acid ester, a poly (methacrylic acid ester), a vinyl chloride-vinyl acetate copolymer, a polypropylene chloride or a polyurethane.

(17) A cover tape for packaging electronic components according to any of the above (12) to (15), which has a luminous transmittance of 70% or more and a haze of 60% or less.

Figure 1:
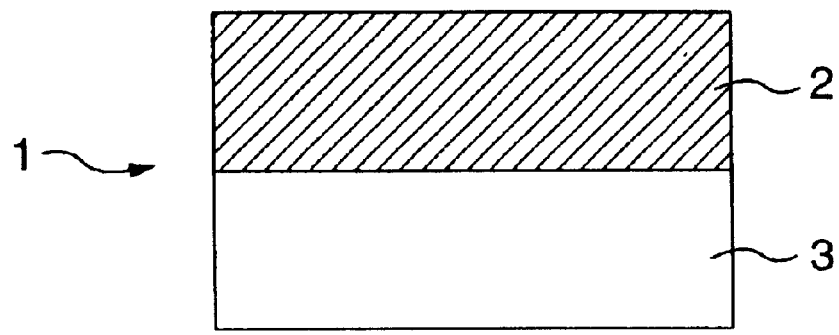
FIG. 1 is a sectional view showing the layer constitution of a cover tape of the present invention.
Figure 2:
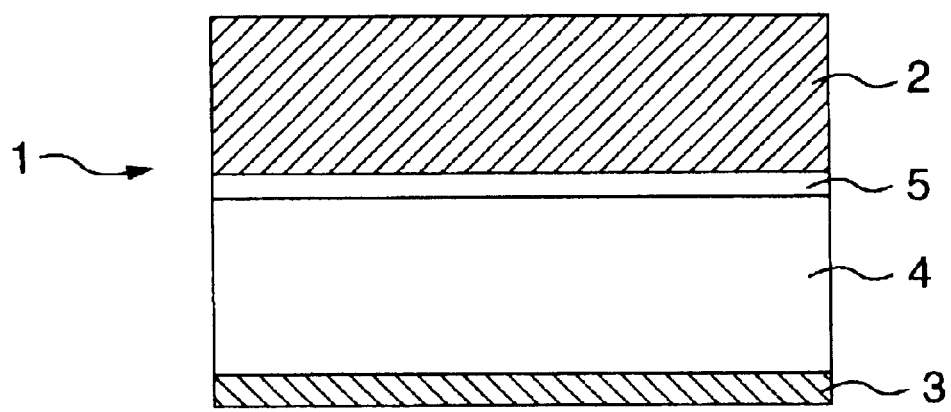
FIG. 2 is a sectional view showing the layer constitution of the cover tapes described in Examples of the present invention.
Figure 3:
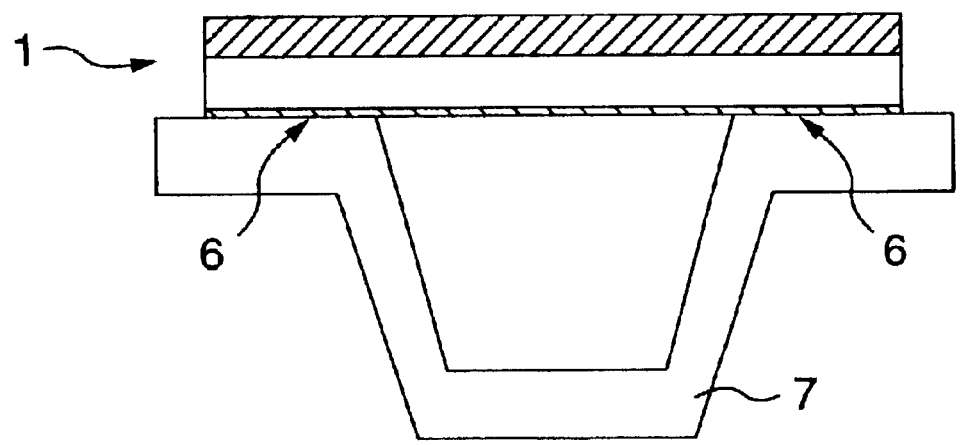
FIG. 3 is a sectional view showing a state of use in which a cover tape of the present invention has been adhered to a carrier tape.

The numerals shown in FIGS. 1 to 3 refer to the followings:

1: Cover tape
2: Biaxially oriented film (layer A)
3: Heat-sealing layer (layer B)
4: Co-extruded layers other than layer B
5: Polyurethane-based adhesive layer
6: Portion to be sealed
7: Carrier tape

DETAILED DESCRIPTION OF THE INVENTION

An example of the constituent elements of the cover tape according to the first embodiment of the present invention is explained with reference to FIG. 1. In this cover tape, the layer A is a biaxially oriented film selected from a biaxially oriented polyester film, a biaxially oriented polypropylene film and a biaxially oriented nylon film, and has a thickness of 6 to 100 μm, transparency and high rigidity.

The layer A may be a laminate of two or more oriented film layers in order to allow the cover tape to have an increased mechanical strength. For the same purpose, a non-oriented polyester layer, a non-oriented nylon layer or a non-oriented polypropylene layer may be allowed to be present between the layer A and the layer B when the layer B is formed by co-extrusion.

The layer B is a thermoplastic resin layer obtained by mixing 100 parts by weight of an ethylene copolymer and 10 to 100 parts by weight of a polystyrene.

The comonomer contained in the ethylene copolymer is a monomer selected from vinyl acetate, acrylic acid, an acrylic acid ester, methacrylic acid, a methacrylic acid ester and an ionomer.

When the amount of the polystyrene in the layer B is less than 10 parts by weight, the difference between the maximum peeling strength and the minimum peeling strength when the cover tape is heat-sealed to a carrier tape and then peeled, becomes more than 0.4 N, which makes the smooth peeling difficult.

When the amount of the polystyrene in the layer B is more than 100 parts by weight, the cover tape has a haze of more than 80%, and the layer B becomes fragile and has a low adhesion to the base layer (the layer A) and gives rise to delamination.

A polyethylene-, ethylene copolymer- or polyurethane-based adhesive or an epoxy-based adhesive may be allowed to be present between the layer A and the layer B in order to increase the adhesion strength of the layer B to the base layer A.

The polystyrene can be selected from various polystyrenes including a high impact polystyrene (HIPS) which contains a rubber component for higher impact resistance. However, the polystyrene is desirably a general purpose polystyrene (GPPS) from the standpoint of transparency and thermal stability.

The layer B is desired to give rise to cohesive failure when the cover tape is peeled from a carrier tape. The cover tape may be smoothly peeled even by interfacial peeling, wherein peeling takes place at the interface of the cover tape and the carrier tape, depending upon the combination of the ethylene copolymer and the polystyrene employed in the layer B. However, when the layer B gives rise to cohesive failure, the plane of adhesion between the cover tape and the carrier tape is different from the plane of peeling; therefore, with such a layer B, the peeling strength of the cover tape is easily controlled and stabilized at the time of cover tape production.

The proportion of the comonomer in the ethylene copolymer of the layer B is 17 to 90 parts by weight relative to 100 parts by weight of ethylene.

When the proportion of the comonomer is less than 17 parts by weight, the cover tape can be heat-sealed to a carrier tape; however, with the passage of time after the sealing, the peeling strength tends to decrease and spontaneous peeling may occur finally.

When the proportion of the comonomer is more than 90 parts by weight, the cover tape can be heat-sealed to a carrier tape as well; however, with the passage of time after the sealing, the peeling strength tends to increase and peeling may be difficult finally. With respect to the ethylene copolymer containing the comonomer other than ethylene in an amount of more than 90 parts by weight, the commercial products are limited in kind and are special products, and therefore are expensive.

The layer B is desired to have a thickness of 0.5 to 50 $\mu$m.

When the thickness is less than 0.5 $\mu$m, the layer B has a low adhesion to the base layer, which causes delamination.

When the thickness is more than 50 $\mu$m, the cover tape has significantly low transparency and a haze of more than 80%, making it difficult to see through and confirm the contents in the pockets of a carrier tape.

The lamination of the layer A and the layer B is conducted by co-extrusion, extrusion coating or gravure coating.

It is preferred to disperse an antistatic agent in the layer B in order to prevent such troubles as the destruction of packed electronic components by static electricity or the adhesion of small electronic components to the cover tape by static electricity when the cover tape is peeled for mounting. Alternatively, a layer having an antistatic agent dispersed therein may be formed on the layer B.

As the antistatic agent, a surfactant and an electrically conductive fine powder can be mentioned. The latter is preferred because it has a smaller fluctuation in antistatic ability.

As the electrically conductive fine powder, there can be mentioned tin oxide, zinc oxide, titanium oxide and carbon black. An effect is obtained by the single use of these powders; however, they may be used in combination of two or more kinds. A surfactant may be added thereto. In dispersing these antistatic agents, the resulting layer must have a surface resistivity of $1 \times 10^{13}$ $\Omega/\square$ or less although the resistance differs depending upon the kind of the antistatic agent used. When the resistance is more than $1 \times 10^{13}$ $\Omega/\square$, the above-mentioned troubles by static electricity may appear.

In preparing the cover tape, the lamination of the layer A and the layer B must be made so that the cover tape has a luminous transmittance of 70% or more and a haze of 80% or less. When the luminous transmittance is less than 70% and the haze is more than 80%, the confirmation by an inspector, of the correctness of packaging of electronic components with the cover tape may be difficult.

Next, description is made on the constituent elements of the cover tape according to the second embodiment of the present invention, referring to Examples.

Example 11 which will be described later, relates to a film in which a nylon (hereinafter abbreviated to Ny), a maleic anhydride-modified PE layer (hereinafter abbreviated to AD), a low-density polyethylene layer (hereinafter abbreviated to LDPE), AD, and an ethylene-vinyl acetate copolymer (hereinafter abbreviated to EVA) are laminated in this order by co-extrusion. Ny is a base layer mentioned in Claim 12, and EVA is an adhesive layer. The LDPE layer is an interlayer formed for cost reduction. If there is no necessity of cost reduction, the thickness of the LDPE layer may be replaced by an increase in the thickness of the adhesive layer. AD has a role of an adhesive for increasing the interlaminar strength of the two layers between which AD is interposed.

Ny may be replaced by a polyester or a polypropylene. Also, EVA may be replaced by any ethylene-α-olefin copolymer mentioned in Claim 14.

In the below-mentioned Examples and Comparative Examples as well, the base layers, the interlayers and the adhesive layers may be replaced by the resins mentioned in Claims.

Comparative Example 11 relates to a film having substantially the same constitution as the film of Example 11. In the film, a biaxially oriented nylon film is used as the base layer Ny; on one side thereof is coated an anchor coat (hereinafter abbreviated to AC) which is an urethane-based thermosetting adhesive; thereon are laminated LDPE and EVA in this order by extrusion lamination.

Example 11, as compared with Comparative Example 11, needed no prior formation of Ny film and, therefore, enabled a reduction of one step.

Example 12 relates to a film obtained by laminating Ny, AD, Ny, AD and EVA in this order by co-extrusion, then subjecting the surface of EVA to a corona treatment, and coating, on the resulting EVA surface, a polymethyl methacrylate (hereinafter abbreviated to PMMA) by gravure coating.

In contrast, in Comparative Example 12, a biaxially oriented nylon film was used for two Ny layers; on one side of one Ny layer was coated an adhesive for dry lamination (hereafter abbreviated to DL) which was a urethane-based thermosetting adhesive; thereon was laminated the other Ny layer by dry lamination. On one side of the resulting laminate was coated DL and thereon was laminated EVA film by dry lamination. A PMMA layer was formed in the same manner as in Example 12.

Example 12, as compared with Comparative Example 12, needed no prior formation of two Ny layers and EVA layer and, therefore, enabled a reduction of three steps.

In Example 13 and Comparative Example 13, the same production processes as in Example 12 and Comparative Example 12 were used except that EVA was replaced by LDPE and PMMA was replaced by a methyl methacrylate-butyl methacrylate copolymer (hereinafter abbreviated to PMMA-BMA). However, into PMMA-BMA was mixed aluminum-doped zinc oxide (hereinafter abbreviated to ZnO) in order to impart electrical conductivity, and ZnO-mixed PMMA-BMA was coated.

Example 13, as compared with Comparative Example 13, needed no prior formation of two Ny layers and LDPE layer and, therefore, enabled a reduction of three steps.

Example 14 relates to a film obtained by laminating Ny, AD and LDPE in this order by co-extrusion, subjecting the surface of LDPE to a corona treatment, coating PMMA-BMA on the corona-treated LDPE surface by gravure coating, and laminating, to the Ny side of the resulting laminate, a biaxially oriented polyethylene terephthalate film (hereinafter abbreviated to PET) by dry lamination using DL, for improved toughness. As in Example 13, into PMMA-BMA was mixed antimony-doped tin oxide (hereinafter abbreviated to ATO) in order to impart electrical conductivity, and ATO-mixed PMMA-BMA was coated.

In contrast, Comparative Example 14 relates to a film obtained by laminating PET, DL, Ny, DL and LDPE in this order by dry lamination, then subjecting the surface of LDPE to a corona treatment, and coating ATO-mixed PMMA-BMA in the same manner as in Example 14.

Example 14, as compared with Comparative Example 14, needed no prior formation of Ny layer and LDPE layer and, therefore, enabled a reduction of two steps.

Example 15 relates to a film obtained by laminating, by co-extrusion, Ny, AD and a linear low-density polyethylene produced using a metallocene catalyst (the polyethylene is hereinafter abbreviated to MLLDPE) in this order, then subjecting the surface of MLLDPE to a corona treatment, coating, on the corona-treated surface of MLLDPE, a vinyl chloride-vinyl acetate copolymer (hereinafter abbreviated to PVC-VA) by gravure coating, and laminating PET on the Ny side of the resulting laminate by dry lamination using DL.

In contrast, Comparative Example 15 relates to a film obtained by laminating PET, DL, Ny, DL and MLLDPE in this order by dry lamination, subjecting the surface of MLLDPE to a corona treatment, and coating, on the corona-treated surface of MLLDPE, PVC-VA by gravure coating.

Example 15, as compared with Comparative Example 15, needed no prior formation of Ny layer and MLLDPE layer and, therefore, enabled a reduction of two steps.

Example 16 and Comparative Example 16 relate to films each obtained by laminating PET to the Ny side of the film obtained in Example 11 or Comparative Example 11, by dry lamination using DL.

Example 16, as compared with Comparative Example 16, needed no prior formation of Ny film and, therefore, enabled a reduction of one step.

In the above embodiment of the present invention, there is no antistatic agent layer on the base layer. However, the presence of an antistatic agent layer is preferred. The antistatic agent includes a surfactant, a π-electron conjugated system conductive polymer such as polypyrrole type, polyaniline type, polythiophene type or the like, and an electrically conductive filler such as tin oxide, indium oxide, zinc oxide, titanium oxide, carbon black, Si-containing organic compound, alkylene glycol-perchlorate (e.g. lithium perchlorate) composite or the like. The electrically conductive filler may be doped with antimony or the like for increased antistatic ability.

In order to allow the adhesive layer mentioned in Claim 12 or 13 to have antistatic ability, the adhesive layer may be coated with an antistatic agent such as conductive polymer, conductive filler, surfactant or the like; or, such an antistatic agent may be kneaded into the adhesive layer.

In preparing the cover tape, the lamination of layers must be made so that the cover tape has a luminous transmittance of 70% or more and a haze of 60% or less. When the luminous transmittance is less than 70% and the haze is more than 60%, the confirmation by an inspector, of the correctness of packaging of electronic components with the cover tape may be difficult.

BEST MODE FOR CARRYING OUT THE INVENTION

Examples of the present invention are shown below. However, the present invention is in no way restricted by these Examples.

EXAMPLES 1 TO 7 AND COMPARATIVE EXAMPLE 1

Examples 1 to 7 are given for the first embodiment of the present invention.

To the biaxially oriented film shown in Table 1 which is the first layer and corresponds to the layer A of the present invention, was dry-laminated the film shown in Table 1, obtained by co-extrusion of the second layer to the seventh layer and the heat-sealing layer which corresponds to the layer B of the present invention, whereby were obtained cover tapes each having the layer constitution shown in FIG. 2.

Each of the cover tapes was cut into a width of 5.5 mm, then sealed to a polystyrene-made carrier tape of 8 mm in width at a sealing temperature of 160° C., and measured for peeling strength.

Each cover tape was also measured for surface resistance using a work surface tester produced by SIMCO, as well as for luminous transmittance and haze by JIS K 7105.

The results of Examples 1 to 7 and the layer constitution and results of Comparative Example 1 are shown in Table 1.

In the columns of base layer and co-extruded layers, each number appearing after the kind (O-PET, DL or the like) of each layer refers to the thickness of the layer (unit: μm); in the column of the ethylene copolymer of the heat-sealing layer, EVA, EMMA or the like refers to ethylene and the comonomer and the number in each parenthesis refers to the proportion of the comonomer in ethylene copolymer; in the column of the polystyrene of the heat-sealing layer, each number below PS refers to the weight parts of PS relative to 100 parts by weight of ethylene copolymer. %, N and $\Omega/\square$ after the columns of luminous transmittance to surface resistivity refer to units of the respective properties.

TABLE 1

|  |  | Example 1 | | Example 2 | | Example 3 | | Example 4 | | Example 5 | | Example 6 | | Example 7 | | Comparative Example 1 | |
|---|---|---|---|---|---|---|---|---|---|---|---|---|---|---|---|---|---|
| Base layer | First layer | O-PET | 12 | O-PET | 12 | O-PP | 12 | O-PET | 9 | O-Ny | 15 | O-PP | 20 | O-PET | 25 | O-Ny | 12 |
| Co-extruded layers | Second layer | DL | 2 | DL | 2 | DL | 2 | DL | 2 | DL | 2 | DL | 2 | DL | 2 | DL | 2 |
| | Third layer | PET | 5 | PET | 5 | Ny | 25 | Ny | 25 | Ny | 25 | Ny | 25 | Ny | 25 | Ny | 25 |
| | Fourth layer | AD | 3 | AD | 3 | AD | 3 | AD | 3 | AD | 3 | AD | 3 | AD | 3 | AD | 3 |
| | Fifth layer | Ny | 12 | Ny | 12 | none | | none | | none | | none | | none | | none | |
| | Sixth layer | AD | 3 | AD | 3 | none | | none | | none | | none | | none | | none | |
| | Seventh layer | LDPE | 20 | LDPE | 20 | none | | none | | none | | none | | none | | none | |
| | Heat-sealing layer | EVA (40) | 8 | EVA (40) | 1 | EVA (40) | 25 | EMMA (49) | 25 | EEA (52) | 25 | ION (17) | 25 | EVA (40) | 25 | EVA (40) | 25 |
| | Ethylene | 100 | | 100 | | 100 | | 100 | | 100 | | 100 | | 100 | | 100 | |

TABLE 1-continued

|  |  | Example 1 | Example 2 | Example 3 | Example 4 | Example 5 | Example 6 | Example 7 | Comparative Example 1 |
|---|---|---|---|---|---|---|---|---|---|
|  | copolymer | PS | PS | PS | PS | PS | PS | PS | PS |
|  | Polystyrene | 40 | 40 | 10 | 20 | 30 | 40 | 50 | 0 |
|  | Antistatic agent |  | Tin oxide 280 |  |  | Surfactant 0.5 |  |  |  |
| Coat layer | Antistatic layer | Not used | Not used | Not used | Not used | Not used | Not used | Tin oxide 1 | Not used |
| Luminous transmittance | % | 88 | 88 | 90 | 92 | 92 | 91 | 71 | 89 |
| Haze | % | 53 | 21 | 65 | 75 | 79 | 79 | 79 | 3 |
| Peeling strength | N | 0.18 | 0.18 | 1.24 | 0.79 | 0.55 | 0.46 | 0.42 | 1.29 |
| Maximum-minimum | N | 0.09 | 0.09 | 0.35 | 0.24 | 0.19 | 0.09 | 0.09 | 0.43 |
| Surface resistivity | $\Omega/\square$ | $>1.0 \times 10^{12}$ | $2.6 \times 10^7$ | $>1.0 \times 10^{12}$ | $>1.0 \times 10^{12}$ | $9.2 \times 10^{12}$ | $>1.0 \times 10^{12}$ | $3.2 \times 10^7$ | $>1.0 \times 10^{12}$ |

In Table 1, the individual symbols refer to the followings: PET: polyethylene terephthalate EVA: ethylene-vinyl acetate copolymer PP: polypropylene EEA: ethylene-ethyl acrylate copolymer Ny: nylon EMMA: ethylene-methyl methacrylate copolymer O-: biaxially oriented ION: ionomer LDPE: low-density polyethylene AD: adhesive resin (acid-modified polyethylene) PS: polystyrene DL: adhesive layer for dry lamination

EXAMPLES 11 TO 16 AND COMPARATIVE EXAMPLES 11 TO 16

Next, Examples of the second embodiment of the present invention are shown. The details of the layer constitutions and production processes of the cover tapes of these Examples and Comparative Examples are not described because they were mentioned previously. The outlines of the layer constitutions of these cover tapes and their performances are shown below. However, the present invention is in no way restricted by these Examples.

Each of the obtained cover tapes was cut into a width of 5.5 mm, then sealed to a polyvinyl chloride-based carrier tape of 8 mm in width at a sealing temperature of 180° C., and, after 5 minutes, measured for peeling strength.

Each cover tape was also measured for luminous transmittance and haze by JIS K 7105.

In Table 2 are shown the layer constitutions and measurement data (peeling strength, luminous transmittance and haze) of Examples; in Table 3 are shown the layer constitutions and measurement data (peeling strength, luminous transmittance and haze) of Comparative Examples.

TABLE 2

|  | Example 11 |  | Example 12 |  | Example 13 |  | Example 14 |  | Example 15 |  | Example 16 |  |
|---|---|---|---|---|---|---|---|---|---|---|---|---|
| First layer | Ny | 15 | Ny | 12 | Ny | 12 | PET | 9 | PET | 12 | PET | 16 |
| Second layer | AD | 2 | AD | 2 | AD | 2 | DL | 2 | DL | 2 | DL | 2 |
| Third layer | LDPE | 15 | Ny | 12 | Ny | 12 | Ny | 15 | Ny | 15 | Ny | 15 |
| Fourth layer | AD | 2 | AD | 2 | AD | 2 | AD | 2 | AD | 2 | AD | 2 |
| Fifth layer | EVA | 15 | EVA | 40 | LDPE | 40 | LDPE | 40 | MLLDPE | 30 | LDPE | 15 |
| Sixth layer |  |  | PMMA | 1 | PMMA-BMA +ZnO | 1 | PMMA-BMA +ATO | 1 | PVC-VA | 1 | AD | 2 |
| Seventh layer |  |  |  |  |  |  |  |  |  |  | EVA | 15 |
| Peeling strength | 0.35 |  | 0.41 |  | 0.25 |  | 0.28 |  | 0.51 |  | 0.48 |  |
| Luminous transmittance | 88 |  | 89 |  | 78 |  | 90 |  | 89 |  | 87 |  |
| Haze | 15 |  | 17 |  | 54 |  | 26 |  | 21 |  | 15 |  |

TABLE 3

|  | Comparative Example 11 |  | Comparative Example 12 |  | Comparative Example 13 |  | Comparative Example 14 |  | Comparative Example 15 |  | Comparative Example 16 |  |
|---|---|---|---|---|---|---|---|---|---|---|---|---|
| First layer | Ny | 15 | Ny | 12 | Ny | 12 | PET | 9 | PET | 12 | PET | 16 |
| Second layer | AD | 1 | DL | 2 | DL | 2 | DL | 2 | DL | 2 | DL | 2 |
| Third layer | LDPE | 15 | Ny | 12 | Ny | 12 | Ny | 15 | Ny | 15 | Ny | 15 |
| Fourth layer | EVA | 2 | DL | 2 | DL | 2 | DL | 2 | AC | 2 | DL | 2 |
| Fifth layer |  |  | EVA | 40 | LDPE | 40 | LDPE | 40 | MLLDPE | 30 | LDPE | 15 |
| Sixth layer |  |  | PMMA | 1 | PMMA-BMA +ZnO | 1 | PMMA-BMA +ATO | 1 | PVC-VA | 1 | EVA | 15 |
| Seventh layer |  |  |  |  |  |  |  |  |  |  |  |  |
| Peeling strength | 0.38 |  | 0.42 |  | 0.28 |  | 0.26 |  | 0.52 |  | 0.46 |  |
| Luminous transmittance | 89 |  | 90 |  | 78 |  | 90 |  | 89 |  | 90 |  |
| Haze | 16 |  | 16 |  | 53 |  | 28 |  | 27 |  | 14 |  |

In each column of the first to seventh layers of Tables 2 and 3, each number appearing at the right side of Ny, AD or the like refers to the thickness (unit: μm) of each layer. In Tables 2 and 3, the unit of peeling strength is N, the unit of luminous transmittance is %, and the unit of haze is %.

As clear from the above Examples, the cover tape of the present invention can be allowed to have a peeling strength which is not too high and not too low and is small in difference between the maximum value and the minimum value; therefore, with the present cover tape, troubles associated with the peeling strength, appearing in the step of mounting of electronic components can be prevented.

Also, the present cover tape has, at the surface to be sealed to a carrier tape, a surface resistivity of $1\times10^{13}$ Ω/□ or less; therefore, the troubles associated with static electricity, appearing in the same step can be prevented.

In the present cover tape, the lamination of layers is made so that the tape can have a luminous transmittance of 70% or more and a haze of 80% or less; therefore, the confirmation of packed electronic components by seeing-through is easy.

Also, the present invention can provide a transparent cover tape having a stable peeling strength, by a simple production process.

What is claimed is:

1. A cover tape for packaging electronic components, which can be heat-sealed to a plastic-made carrier tape having pockets capable of storing electronic components, formed regularly therein and which comprises a layer (A) of a biaxially oriented film layer made of a member selected from the group consisting of polyester, polypropylene and nylon and a layer (B) of a thermoplastic resin layer composed of 100 parts by weight of an ethylene copolymer and 10 to 100 parts by weight of a polystyrene, laminated to one side of the layer A, based on the total weight of the thermoplastic resin layer, wherein the proportion of a comonomer of the ethylene copolymer contained in the layer B is 17 to 90 parts by weight relative to 100 parts by weight of ethylene.

2. A cover tape for packaging electronic components according to claim 1, wherein at least one kind of layer selected from the group consisting of a non-oriented polyester layer, a non-oriented nylon layer and a non-oriented polypropylene layer is interposed between the layer A and the layer B.

3. A cover tape for packaging electronic components according to claim 1 or 2, wherein a comonomer of the ethylene copolymer contained in the layer B is at least one kind selected from the group consisting of vinyl acetate, acrylic acid, an acrylic acid ester, methacrylic acid, a methacrylic acid ester and an ionomer.

4. A cover tape for packaging electronic components according to claim 1 or 2, wherein the layer B has a thickness of 0.5 to 50 μm.

5. A cover tape for packaging electronic components according to claim 1 or 2, wherein the layer B gives rise to cohesive failure and peeling when the cover tape is heat-sealed to the carrier tape and then is peeled from the carrier tape.

6. A cover tape for packaging electronic components according to claim 1 or 2, wherein an electrically conductive powder made of tin oxide, zinc oxide, titanium oxide, carbon black or a combination thereof and/or a surfactant is dispersed in the layer B and the layer B has a surface resistivity of $1\times10^{13}$Ω/□ or less.

7. A cover tape for packaging electronic components according to claim 1 or 2, wherein an antistatic layer which has dispersed therein an electrically conductive powder made of tin oxide, zinc oxide, titanium oxide, carbon black or a combination thereof and/or a surfactant, is formed on the surface of the layer B and the antistatic layer has a surface resistivity of $1\times10^{13}$Ω/□ or less.

8. A cover tape for packaging electronic components according to claim 1 or 2, which has a peeling strength of 0.1 to 1.3 N per mm of the sealed width of the cover tape, when the cover tape is heat-sealed to the carrier tape and then peeled from the carrier tape.

9. A cover tape for packaging electronic components according to claim 1 or 2, which has a luminous transmittance of 70% or more and a haze of 80% or less.

10. A cover tape for packaging electronic components according to claim 1 or 2, which has a difference between the maximum value and the minimum value in peeling strength, of 0.01 to 0.4 N per mm of the sealed width of the cover tape, when the cover tape is heat-sealed to the carrier tape and then peeled from the carrier tape.

11. A cover tape for packaging electronic components, according to claim 1 which comprises at least two layers of an adhesive layer and a base layer, the adhesive layer being present on the side of the cover tape heat-sealed to the carrier tape, said two layers being laminated with each other by co-extrusion, and the base layer being a polyester, a nylon or a polypropylene.

12. A cover tape for packaging electronic components according to claim 11, wherein the adhesive layer is made of an ethylene-α-olefin copolymer and the α-olefin is vinyl acetate, acrylic acid, an acrylic acid ester, methacrylic acid or a methacrylic acid ester.

13. A cover tape for packaging electronic components, according to claim 1 which comprises at least three layers of an adhesive layer, an interlayer and a base layer in this order, the adhesive layer being present on the side of the cover tape heat-sealed to the carrier tape, the interlayer and the base layer being laminated with each other by co-extrusion, and the adhesive layer being laminated by gravure coating.

14. A cover tape for packaging electronic components according to claim 13, wherein the interlayer is made of an ethylene-α-olefin copolymer and the α-olefin is vinyl acetate, acrylic acid, an acrylic acid ester, methacrylic acid or a methacrylic acid ester.

15. A cover tape for packaging electronic components according to claim 13 or 14, wherein the adhesive layer is made of an ethylene-α-olefin copolymer wherein the α-olefin is vinyl acetate, acrylic acid, an acrylic acid ester, methacrylic acid or a methacrylic acid ester, a poly (methacrylic acid ester), a vinyl chloride-vinyl acetate copolymer, a polypropylene chloride or a polyurethane.

16. A cover tape for packaging electronic components according to any of claims 11 to 14, which has a luminous transmittance of 70% or more and a haze of 60% or less.

* * * * *